United States Patent
Ishii et al.

(10) Patent No.: US 10,683,566 B2
(45) Date of Patent: Jun. 16, 2020

(54) CU-BASED SINTERED BEARING AND PRODUCTION METHOD FOR CU-BASED SINTERED BEARING

(71) Applicant: Diamet Corporation, Niigata-shi (JP)

(72) Inventors: Yoshinari Ishii, Niigata (JP); Shinichi Takezoe, Niigata (JP); Tsuneo Maruyama, Niigata (JP)

(73) Assignee: Diamet Corporation, Niigata-shi (JP)

( * ) Notice: Subject to any disclaimer, the term of this patent is extended or adjusted under 35 U.S.C. 154(b) by 356 days.

(21) Appl. No.: 15/507,567

(22) PCT Filed: Sep. 4, 2015

(86) PCT No.: PCT/JP2015/075180
§ 371 (c)(1),
(2) Date: Mar. 30, 2017

(87) PCT Pub. No.: WO2016/035880
PCT Pub. Date: Mar. 10, 2016

(65) Prior Publication Data
US 2017/0283911 A1    Oct. 5, 2017

(30) Foreign Application Priority Data
Sep. 4, 2014    (JP) .................................. 2014-180169

(51) Int. Cl.
*C22C 9/06*    (2006.01)
*B22F 1/00*    (2006.01)
(Continued)

(52) U.S. Cl.
CPC .................. *C22C 9/06* (2013.01); *B22F 1/00* (2013.01); *B22F 3/02* (2013.01); *B22F 3/10* (2013.01); *B22F 3/16* (2013.01); *B22F 5/00* (2013.01); *B22F 5/106* (2013.01); *C22C 1/0425* (2013.01); *F16C 33/121* (2013.01);
(Continued)

(58) Field of Classification Search
None
See application file for complete search history.

(56) References Cited

U.S. PATENT DOCUMENTS 5,938,864 A    8/1999   Tomikawa et al.
8,999,232 B2*  4/2015   Ishii ...................... C22C 1/0425
                                                     420/472
(Continued)

FOREIGN PATENT DOCUMENTS

JP   62-133027 A    6/1987
JP   01-198407 A    8/1989
(Continued)

OTHER PUBLICATIONS

Extended European Search Report dated Feb. 20, 2018 for the corresponding European Patent Application No. 15838869.4.
(Continued)

*Primary Examiner* — Adam Krupicka

(57) ABSTRACT

Provided is a Cu-based sintered bearing comprising: 15-36 mass % of Ni; 3-13 mass % of Sn; 0.05-0.55 mass % of P; and 0.02-4 mass % of C in total, the balance consisting of Cu and inevitable impurities, wherein the content of C forming an alloy with a matrix within Cu—Ni-based main phase grains is 0.02-0.10 mass %.

21 Claims, 1 Drawing Sheet

(51) Int. Cl.
  *B22F 5/00* (2006.01)
  *B22F 3/02* (2006.01)
  *B22F 3/10* (2006.01)
  *C22C 1/04* (2006.01)
  *F16C 33/14* (2006.01)
  *B22F 3/16* (2006.01)
  *B22F 5/10* (2006.01)
  *F16C 33/12* (2006.01)

(52) U.S. Cl.
  CPC .......... *F16C 33/128* (2013.01); *F16C 33/145* (2013.01); *B22F 2301/10* (2013.01); *B22F 2998/10* (2013.01); *F16C 2204/10* (2013.01)

(56) References Cited

U.S. PATENT DOCUMENTS

| | | |
|---|---|---|
| 2003/0143096 A1 | 7/2003 | Shimizu |
| 2004/0120614 A1 | 6/2004 | Noboru et al. |
| 2007/0258668 A1 | 11/2007 | Shimizu et al. |
| 2009/0011268 A1 | 1/2009 | Shimizu et al. |
| 2009/0311129 A1 | 12/2009 | Hirakawa et al. |
| 2012/0145284 A1 | 6/2012 | Ishii et al. |
| 2012/0204677 A1 | 8/2012 | Ishii |
| 2013/0189150 A1 | 7/2013 | Ishii et al. |
| 2013/0223774 A1 | 8/2013 | Ishii et al. |

FOREIGN PATENT DOCUMENTS

| | | |
|---|---|---|
| JP | 2004-315940 A | 11/2004 |
| JP | 2005-082867 A | 3/2005 |
| JP | 2006-063398 A | 3/2006 |
| JP | 2006-090482 A | 4/2006 |
| JP | 2006-199977 A | 8/2006 |
| JP | 4521871 B | 8/2010 |
| JP | 2013-023707 A | 2/2013 |
| JP | 2013-144849 A | 7/2013 |
| JP | 5337884 B | 11/2013 |
| JP | 5386585 B | 1/2014 |
| WO | WO-2006/022337 A | 3/2006 |
| WO | WO-2006/077826 A | 7/2006 |
| WO | WO-2008/001789 A | 1/2008 |
| WO | WO-2010/147139 A | 12/2010 |
| WO | WO-2011/024941 A | 3/2011 |
| WO | WO-2012/063785 A | 5/2012 |
| WO | WO-2012/063786 A | 5/2012 |

OTHER PUBLICATIONS

Office Action dated Jan. 3, 2018 for the corresponding Chinese Patent Application No. 201580046121.2.
International Search Report dated Nov. 17, 2015 for the corresponding PCT Application No. PCT/JP2015/075180.
International Search Report dated Dec. 15, 2015 for the related PCT Application No. PCT/JP2015/075751.
Office Action dated Dec. 4, 2017 for the related Chinese Patent Application No. 201580047730.X.
Extended European Search Report dated May 22, 2018 for the related European Patent Application No. 15839255.5.
Non-Final Office Action in related U.S. Appl. No. 15/510,561, dated Nov. 2, 2018.

* cited by examiner

CU-BASED SINTERED BEARING AND PRODUCTION METHOD FOR CU-BASED SINTERED BEARING

TECHNICAL FIELD

The present invention relates to a Cu-based sintered bearing and a method of producing a Cu-based sintered bearing.

Priority is claimed on Japanese Patent Application No. 2014-180169, filed Sep. 4, 2014, the content of which is incorporated herein by reference.

BACKGROUND ART

Conventionally, bearings made of sintered parts with various compositions are used for internal combustion engines of automobiles.

Particularly, in the oil-impregnated sintered bearing in which lubrication is obtained by retaining lubrication oil in pores, it is known that the Cu-based material is useful to obtain low friction coefficient. Particularly, seizure can be suppressed by using the bearing made of the Cu-based sintered part (Cu-based sintered bearing) for supporting the rotating shaft made of the Fe-based alloy.

On the other hand, as the bearing for the use in which high surface pressure is placed by loading, vibration or the like, the iron-based or the iron-copper-based sintered part has been used in order to sustain the high surface pressure. However, the iron-based or the iron-copper-based sintered part has high friction coefficient, and is not suitable for use in which high precision control is required, such as being used for the bush of the throttle valve and the like. Thus, the ball bearing is used instead, which causes cost increase.

Recently, for the sake of cost reduction and the like, using the Cu-based sintered part as these bearings that requires the high precision control is demanded.

As the Cu-based sintered part, there are ones made of: the bronze-based material; the phosphor-bronze-based material; and the copper-nickel-based material. Among these, the bronze-based material and the phosphor-bronze-based material have low material strength to begin with and cannot be used in the condition where the high surface pressure is placed. On the other hand, strength is increased by adding a large amount of Ni in the Cu-based sintered part made of the copper-nickel-based material. The sintered part made of the copper-nickel-based material is regarded as a promising sintered part applicable for the part to be exposed to the high surface pressure and to be controlled with high precision.

As the Cu-based sintered part made of the Cu—Ni-based material, there are ones disclosed in Patent Literature 1 (PTL 1) and Patent Literature 2 (PTL 2).

CITATION LIST

Patent Literature

PTL 1: Japanese Unexamined Patent Application, First Publication No. 2006-199977 (A)

PTL 2: Japanese Unexamined Patent Application, First Publication No. 2006-63398 (A)

SUMMARY OF INVENTION

Technical Problem

However, in the copper-nickel-based sintered part, there is a concern about wear progression due to insufficiency in supporting the load subjected on the bearing in the use of the high surface pressure even though it has a relatively higher strength than the bronze-based material and the phosphor-bronze-based material.

By conducting assiduous examinations, the inventors of the present invention found that the material strength is improved by reducing the C content in the copper-nickel sintered part. However, when the C content is reduced extensively, dimensional change and deformation in sintering are increased. These deteriorate the production yield since the dimensional accuracy does not fall within standard in sizing of the post-process, and cause reduced productivity, leading increased production cost eventually.

The present invention is made under the circumstances described above. The purpose of the present invention is to provide a Cu-based sintered bearing that: can be used under high surface pressure; has low dimensional change in sintering; and can be produced in high productivity.

Solution to Problem

An aspect of the present invention is a Cu-based sintered bearing (hereinafter, referred as "the Cu-based sintered bearing of the present invention") including: 15 mass % or more and 36 mass % or less of Ni; 3 mass % or more and 13 mass % or less of Sn; 0.05 mass % or more and 0.55 mass % or less of P; and 0.02 mass % or more and 4 mass % or less of C in total; and the Cu balance containing inevitable impurities, wherein a content of C alloyed with a matrix in grains of a Cu—Ni-based main phase is 0.02 mass % or more and 0.10 mass % or less.

In the Cu-based sintered bearing of the present invention, a porosity of the Cu-based sintered bearing may be 8% or more and 25% or less.

Other aspect of the present invention is a method of producing a Cu-based sintered bearing (hereinafter, referred as "the method of producing a Cu-based sintered bearing of the present invention"), the method including the steps of: mixing one or more raw material powders containing: 15 mass % or more and 36 mass % or less of Ni; 3 mass % or more and 13 mass % or less of Sn; 0.05 mass % or more and 0.55 mass % or less of P; and 0.02 mass % or more and 0.10 mass % or less of C; and the Cu balance containing inevitable impurities to obtain a mixed powder; press-molding the mixed powder to obtain a green compact; and sintering the green compact after the step of press-molding.

In the method of producing a Cu-based sintered bearing of the present invention, a total amount of C of a C content included in the raw material powder and a C content originated from the free graphite may be 0.02 mass % or more and 4 mass % or less.

In addition, in the method of producing a Cu-based sintered bearing of the present invention, the raw material powders may be a Cu—Ni alloy powder, a Sn powder, and a Cu—P alloy powder.

Advantageous Effects of Invention

According to the present invention, a Cu-based sintered bearing with strength and high abrasion resistance can be provided by setting the alloy composition included in the materials to: 15 mass % or more and 36 mass % or less of Ni; 3 mass % or more and 13 mass % or less of Sn; 0.05 mass % or more and 0.55 mass % or less of P; and 0.02 mass % or more and 0.10 mass % or less of C.

In addition, according to the Cu-based sintered bearing of the present invention, there are: C alloyed with the matrix (C in the grain of Cu—Ni-based main phase); and C existing as free graphite in the alloy.

The C alloyed with the matrix is originated from the C contained in the raw material Cu—Ni alloy powder. By setting the C content alloyed with the matrix to 0.02 mass % or more and 0.10 mass % or less, the dimensional change in sintering can be stabilized.

On the other hand, the C dispersedly distributed in the matrix as free graphite without being alloyed with the matrix gives excellent lubricity together with the lubrication oil to the bearing, and is effective on improving abrasion resistance.

DESCRIPTION OF EMBODIMENTS

Figure 1:
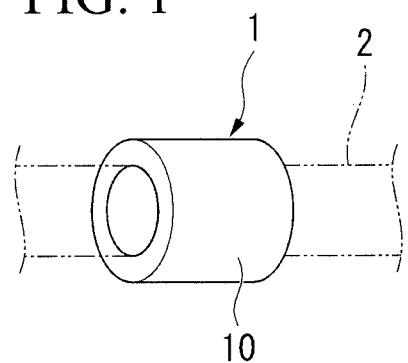
FIG. 1 is a perspective view showing an example of a Cu-based sintered bearing related to an embodiment of the present invention.

An embodiment of the present invention is explained in reference to drawings below. However, the present invention is not limited by descriptions of the embodiment below. In the drawings used for the explanations below, a characteristic part is shown as an enlarged manner occasionally for emphasizing the characteristic part for convenience; and the dimension ratio of each constituent or the like is not necessarily the same as the actual case.

FIG. 1 shows the ring-shaped bearing 1 (the Cu-based sintered bearing) made of the Cu-based sintered part 10 according to the present invention. For the shaft 2 supported by the bearing 1, the Fe-based alloy such as stainless steel and the like is used. The shaft 2 slides rotationally or linearly relative to the bearing 1.

The bearing 1 of the present embodiment is used for the throttle of the inner combustion engine of the automobile, the control motor such of the valve system, or the like, for example. Under the uses of the above-described purposes, vibration is added to the loads subjected to the bearing 1. Thus, occasionally, the surface pressures and the rotation speed become 15 MPa-25 MPa and 1000 rpm-8000 rpm, respectively. Under the uses of these high load and high rotation speed, the conventional Cu-based sintered bearing does not have a sufficient strength; and abnormal abrasion occurs, occasionally. Thus, the conventional Cu-based sintered bearing does not have a sufficient reliability. Contrary to that, the Cu-based sintered bearing of the present embodiment of the present invention has a sufficient strength and can be applicable for the throttle of the inner combustion engine of the automobiles and the control motor of the valve system or the like.

Figure 2:
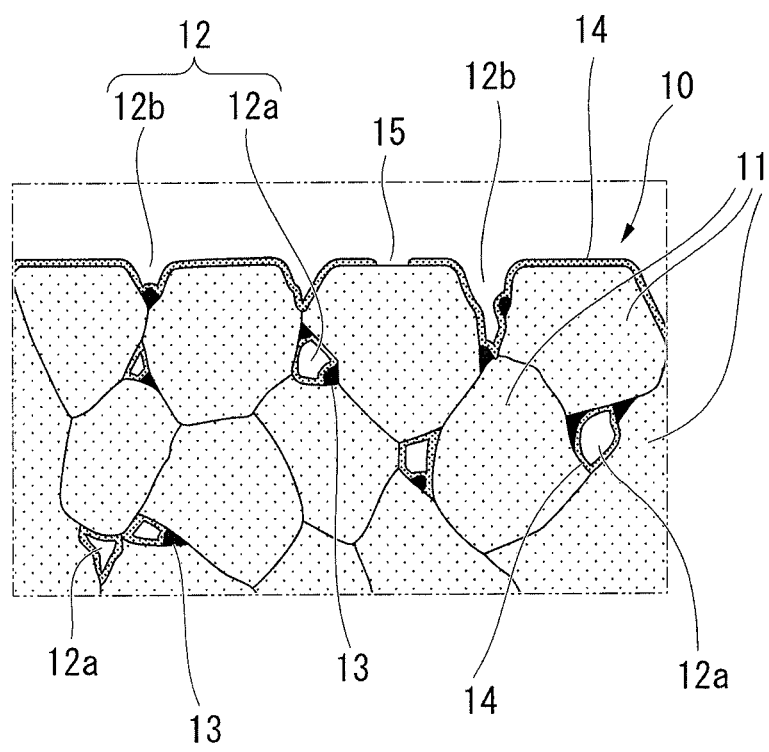
FIG. 2 is an enlarged structural diagram of a Cu-based sintered part constituting the Cu-based sintered bearing related to an embodiment of the present invention.

FIG. 2 is a structural diagram, in which the cross section in the vicinity of the surface of the Cu-based sintered part 10, which constitutes the Cu-based sintered bearing 1 of the present embodiment, is observed by an optical microscope. FIG. 2 is only a schematic diagram, and the characteristic part is shown by being enlarged.

As shown in FIG. 2, the Cu-based sintered part 10 has the structure in which, multiple grains 11 (the grains of Cu—Ni-based main phase) interposed by pores 12 (the internally-existing pores 12a and the externally-opened pores 12b) in grain boundary parts are integrated by sintering; and free graphite 11 (C (Free)) is dispersed in the inside of the pores 12.

In addition, the Cu-based sintered part 10 has the alloy layer with high Sn concentration 14 containing 30 mass % or more of Sn in the inside and on the surface thereof.

The grains 11, which are the grains of Cu—Ni-based main phase, are made of the Cu—Ni alloy grains containing Sn, P, and C. The matrix of the Cu-based sintered part 10 is constituted by sintering the multiple grains 11.

Excellent abrasion resistance of the Cu-based sintered part 10 is ensured by the grains 11 constituting the matrix being the grains of Cu—Ni-based main phase.

In addition, high lubrication performance can be obtained by the lubrication action of the free graphite with high lubricity distributed in the pores 12 dispersedly distributed in the Cu-based sintered part 10. In addition, abrasion resistance is further improved by the lubrication oil impregnated in the pores 12 of the Cu-based sintered part 10.

The Cu-based sintered part 10 includes C contained in the state where the C is alloyed in the grains 11, in addition to the above-described free graphite 13. This C is originated from the C included in the material Cu—Ni alloy powder. By having C included in the grains 11 in an appropriate level, the dimensional change between sintered materials before and after sintering can be stabilized.

The alloy layer with high Sn concentration 14 is formed: on the inner surface of the internally-existing pores 12a, which internally exist in the Cu-based sintered part 10; on the inner surface of the externally-opened pores 12b, which are formed to be opened on the surface of the Cu-based sintered part 10; and on the periphery of the opened part of the externally-opened pores 12b. Corrosion resistance of the Cu-based sintered part 10 against organic acid can be improved by the alloy layer with high Sn concentration 14.

As shown in FIG. 2, the exposed part 15, in which the grain 11 is exposed without the alloy layer with high Sn concentration 14 being formed, is formed in the part in which the interval between the externally-opened pores 12b formed is broad. However, the exposed part 15 is not formed in the externally-opened pores 12b. Thus, organic acid does not invade into the grain boundary of the grains 11. Thus, even if the exposed part 15 is formed, corrosion resistance against organic acid can be improved sufficiently.

The method of producing the Cu-based sintered bearing 1 will be described in detail later. The Cu-based sintered bearing 1 can be obtained by: uniformly mixing predetermined amounts of the raw material powder, which is made of the Cu—Ni alloy powder, the Sn powder, and the Cu—P powder, and the graphite powder to obtain the mixed powder; press molding the mixed powder to obtain the green compact; and sintering the obtained green compact at 860-970° C., for example.

It is preferable that the Cu-based sintered part 1 includes: 15 mass % or more and 36 mass % or less of Ni; 3 mass % or more and 13 mass % or less of Sn; 0.05 mass % or more and 0.55 mass % or less of P; and 0.02 mass % or more and 4 mass % or less of C in total; and the Cu balance containing inevitable impurities. In addition, it is preferable that C at 0.02 mass % or more and 0.10 mass % or less is included in the grains 11. In addition, it is preferable that the porosity of the Cu-based sintered bearing 1 is 8% or more and 25% or less.

Reasons for defining the preferable ranges of: each of the composition ratio of the Cu-based sintered part 10 constituting the Cu-based sintered bearing 1; and the porosity are explained below.

[Ni: 15 Mass % or More and 36 Mass % or Less]

Ni forms solid solution with: the matrix; and Cu, Sn and P, in the grains 11. Addition of Ni is effective on improving strength and abrasion resistance of the Cu-based sintered part 10. In order to obtain the intended strength and abrasion resistance, it is preferable that the Ni content is set to 15 mass % or more.

In addition, if the Ni content exceeded 36 mass %, sinterability would be reduced drastically; and reduction of strength and abrasion resistance would be unavoidable. Thus, it is preferable that the Ni content is set to 36 mass % or less.

Although it is not necessarily essential configuration, a more preferable Ni content is from 17.2 mass % to 35.2 mass %. An even more preferable Ni content is from 20.6 mass % to 35.2 mass %.

[Sn: 3 Mass % or More and 13 Mass % or Less]

Sn forms solid solution with Cu, Sn and P, in the grains 11. Addition of Sn is effective on improving strength and abrasion resistance of the Cu-based sintered part 10. In order to obtain the intended strength and abrasion resistance, it is preferable that the Sn content is set to 3 mass % or more.

In addition, if the Sn content exceeded 13 mass %, the dimensional change in sintering would be increased for the dimensional accuracy to be reduced. Thus, it is preferable that the Sn content is set to 13 mass % or less.

Although it is not necessarily essential configuration, a more preferable Sn content is from 3.0 mass % to 11.2 mass %. An even more preferable Ni content is from 3.0 mass % to 10.3 mass %.

In addition, by adding Sn, the alloy layer with high Sn concentration is formed on the inner surfaces of the internally-existing pores 12a and the externally-opened pores 12b and on the periphery of the opened part of the externally-opened pores 12b. The alloy layer with high Sn concentration is effective on improving corrosion resistance of the Cu-based sintered part 10.

[P: 0.05 Mass % or More and 0.55 Mass % or Less]

P forms solid solution with: Ni or Cu; Ni; and Sn mainly in the grain boundaries of the grains 11. Addition of P is effective on improving strength and abrasion resistance of the Cu-based sintered part 10.

In order to obtain the intended strength and abrasion resistance, it is preferable that the P content is set to 0.05 mass % or more.

In addition, if the P content exceeded 0.55 mass %, the dimensional change in sintering would be increased for the dimensional accuracy to be reduced. Thus, it is preferable that the P content is set to 0.55 mass % or less.

Although it is not necessarily essential configuration, a more preferable P content is from 0.1 mass % to 0.55 mass %. An even more preferable P content is from 0.2 mass % to 0.4 mass %.

[C Contents]

There are two C contents, one of which is the content of C internally-existing in the grains 11 and alloyed with the matrix, and other of which is the content of C existing as free graphite 13 in the alloy.

The Cu-based sintered part 10 includes C at 0.02 mass % or more and 4 mass % or less as the total amounts of the C alloyed with the matrix and the C as the free graphite 13.

Although it is not necessarily essential configuration, a more preferable C content in total is from 0.02 mass % to 3 mass %. An even more preferable C content in total is from 1 mass % to 3 mass %.

[C Content Alloyed with the Matrix (Combined): 0.02 Mass % or More and 0.10 Mass % or Less]

The C (Combined) internally-existing in the grains 11 and alloyed with the matrix is originated from the C included in the material Cu—Ni alloy powder. By including the C at a predetermined amount in the Cu—Ni alloy powder, which is one of material powders, the dimensional change in sintering of the green compact, which is made of the Cu—Ni alloy powder; the Sn powder; the Cu—P alloy powder; and the graphite powder, can be stabilized.

The C included in the Cu—Ni raw material powder is effective on suppressing sintering between each of the raw material powders.

If the content of C included in the Cu—Ni raw material powder were less than 0.02 mass %, sintering would be stimulated excessively due to lack of a suppresser of sintering between each of the raw material powders for the dimension to be shrunk excessively by sintering. Thus, it is preferable that the content of C included in the raw material powder is set to 0.02 mass % or more. In addition, it is preferable that the content of C internally-existing in the grains 11 is set to 0.02 mass % or more because of the setting of the C content in the raw material powder.

In addition, if the content of C included in the raw material powder exceeded 0.10 mass %, it would be harder for sintering between each of the raw material powders to proceed; and expansion of the dimension by sintering would be high. Thus, it is preferable that the content of C included in the raw material powder is set to 0.10 mass % or less. In addition, it is preferable that the content of C internally-existing in the grains 11 is set to 0.10 mass % or less because of the setting of the C content in the raw material powder.

By setting the content of the C alloyed with the matrix to 0.02 mass % or more and 0.10 mass % or less, the dimension change rate between before and after sintering can be kept in the range of −2% or more and 0% or less.

Although it is not necessarily essential configuration, a more preferable range of the content of C alloyed with the matrix is from 0.02 mass % to 0.081 mass %. An even more preferable range of the content of C alloyed with the matrix is 0.038 mass % to 0.081 mass %.

[C Content as Free Graphite (Free): 4 Mass % or Less]

The C included as free graphite 13 is originated from the graphite powder mixed with the raw material powders. The C included as free graphite 13 gives excellent lubricity to the Cu-based sintered part 10 together with the lubrication oil, and improves abrasion resistance. However, it is possible that the C included as free graphite inhibits formation of connections between each of the grains 11 for the strength of the Cu-based sintered part 10 to be reduced, since the C included as free graphite 13 interposes in grain boundaries of the grains 11. Thus, in the case where a sufficient lubricity is obtained by the lubrication oil alone, the free graphite 13 may not be formed. In such a situation, the graphite powder is not added in mixing the material powders.

In addition, adding the C included as free graphite 13 at 4 mass % or less improves lubricity, while minimizing the decrease of the strength and abrasion resistance of the Cu-based sintered part 10.

Although it is not necessarily essential configuration, it is preferable that the lower limit of the content of C included as free graphite 13 is set to 0.988 mass % in order to give a sufficient lubrication function.

Although it is not necessarily essential configuration, a more preferable range of the content of C included as free graphite 13 is from 0.988 mass % to 3.787 mass %. An even more preferable range of the content of C included as free graphite 13 is from 1.503 mass % to 3.787 mass %.

[Cu Balance]

The Cu-based sintered part 10 is suitably used as the bearing for the Fe-based alloy shat to slide.

The shaft 2 made of the Fe-based alloy tends to be seized up depending on the material of the bearing 1 (for example, the case in which the Fe-based alloy is used, or the like). It is required that the bearing 1 is made of a material by which seizure is not likely to occur, even if it slides with the counterpart made of the Fe-based alloy.

By using the Cu-based sintered part 10, which has the composition predominantly in Cu, as the bearing 1, the seizure with the shaft made of the Fi-based alloy is not likely to occur.

[Porosity]

The pores 12 have action improving abrasion resistance of the bearing 1 by: impregnating and storing the lubrication oil therein; and supplying the lubrication oil when the bearing 1 slides with the counterpart (for example, the shaft 2 shown in FIG. 1). In addition, the pores 12 have action absorbing strong impact or the like loaded on the bearing 1 for the abrasion on the bearing 1 to be suppressed.

The porosity for obtaining the intended abrasion resistance is 8% or more.

In addition, if the porosity exceeded 25%, strength would be reduced; and the abrasion resistance would be reduced. Thus, it is preferable that the porosity is set to 25% or less.

Although it is not necessarily essential configuration, a more preferable range of the porosity is from 10% to 25%. An even more preferable range of the porosity is from 15% to 25%.

The porosity of the bearing 1 can be measured by the open porosity test (JPMA M 02-1992) of the sintered metal material defined by Japan Powder Metallurgy Industry Association.

[Production Procedure of the Cu-Based Sintered Bearing]

Production procedure of the Cu-based sintered bearing 1 of the present embodiment is explained below.

First, as the starting materials, the Cu—Ni alloy powder or the Ni—Cu alloy powder; the Cu—P alloy powder; the Sn powder; and the graphite powder, each of which has a predetermined average gain size within the range of about 10 μm-100 μm, are prepared. In addition, in order to adjust the component composition of Cu and Ni, the Cu powder and the Ni powder may be prepared further.

Next, after blending each of these powders to obtain the final goal composition ratio, 0.1-1.0% of lubricant such as zinc stearate and the like, for example about 0.5%, is added to the mixture; and the mixture is uniformly mixed for about tens of minutes by a mixer to obtain the mixed powder. In mixing, it is preferable that the blended powders are uniformly dispersed by using the double cone type mixer, the V-type mixer, or the like.

Next, the mixed powder is stored in the mold, and subjected to press-molding under the pressure of 100 MPa-700 MPa to obtain a green compact in an intended shape, such as in a ring-shape, for example.

The bearing 1 in the intended shape can be obtained by: sintering the green compact at a predetermined temperature in the range of 860-970° C. in the endothermic gas atmosphere, which is obtained by mixing natural gas and air and passing the mixed gas thorough heated catalyst to be decomposed and denatured, for example; and then performing sizing.

During sintering, Sn and Cu—P, which are low melting point raw materials (about 232° C., and about 718° C., respectively), are melted in the sintering process; and Sn and P react with grains made of the Cu—Ni alloy powder or grains made of the Ni—Cu alloy powder. Because of this, sintering with the grains made of the Cu—Ni alloy powder or the grains made of the Ni—Cu alloy powder are performed; and the structure shown in FIG. 2, in which the free graphite 13 exists in the pore parts in the grain boundaries of the grains 11, is obtained after sintering.

In the case where the Cu—Ni alloy powder or the Ni—Cu alloy powder is produced, the atomizing method in which powdering is performed by quenching from the alloy melt is used. In this case, C is added for desulfurization or the like occasionally. At this process, the effect of C as impurities is significant. Thus, by adjusting the content of C added for desulfurization, the content of C included in these alloy powders can be controlled.

EXAMPLES

The present invention is explained in more detail by showing Examples below. However, the present invention is not limited by the descriptions of Examples.

[Preparation of Samples]

As raw materials, the Cu—Ni powder (grain size: 100-mesh), the Cu—P alloy powder (grain size: 200-mesh), the graphite powder (grain size: 150-mesh), the Sn powder (grain size: 250-mesh), and the Ni powder (average grain size: 4 μm) were prepared. The Ni content in the Cu—Ni alloy powder and the P content in the Cu—P alloy powder are shown in Table 1 as mass %.

Next, raw material powders were blended in the ratios shown in Table 1. Then, 0.5% of zinc stearate was added, and the mixture was mixed for 20 minutes by a V-type mixer to produce the mixed powders.

Next, the mixed powder was stored in the mold, and subjected to press-molding under the predetermined pressure in the range of 100 MPa-700 MPa to obtain a green compact.

Next, the green compact was sintered in the endothermic gas atmosphere, which was obtained by mixing natural gas and air and passing the mixed gas thorough heated catalyst to be decomposed and denatured. The sintering temperature for each sample is shown in Table 1.

Next, the obtained sintered body was stored in a mold; and sizing was performed under the predetermined pressure in the range of 200 MPa-700 MPa.

Next, the sintered material was impregnated with the synthetic oil for lubrication; and the inside of the sintered material was impregnated by the synthetic oil for lubrication by the vacuum lubrication process.

By following the above-described processes, ring-shaped Cu-based sintered bearings of Examples 1-19 of the present invention and Comparative Examples 1-8, each of which had the dimension of: 18 mm of the outer diameter; 8 mm of the inner diameter; and 4 mm of the height, were produced.

Each parameter during producing each sample is summarized in Table 1 below.

Next, the component composition; the porosity; the radial pressing strength as the result of the radial pressing test; the dimensional change between before and after sintering; the yield; and the maximum wear depth as the abrasion test, of each sample are summarized in Table 2 below. In the component composition in Table 1, the column of "C (Free)" indicates the mass % of the C interposing in grain boundaries as free graphite. Similarly, the column of "C (Combined)" indicates the mass % of the C alloyed and included in the insides of the grains. In addition, "C (in total)"

indicates the total amount of C included in the sample as C (Free) and C (Combined) in mass %.

Each of the measuring methods is explained below.

[Component Composition]

The component composition was obtained from the contents of metals included in the raw material powders.

In addition, among the total amount of C included in each sample, the ratio of C (Free) interposing in the grain boundaries as free graphite; and C (Combined) alloyed and included in the insides of the grains, was obtained by the method described below.

First, the total amount of C included in the sample of the sintered bearing was measured by the gas analysis method. Then, the analysis of the content of the C (Free) included as free graphite was performed according to the method defined as JIS1211-1995. The C (Combined), which was alloyed and included in the insides of the grains, was obtained by subtracting the content of free graphite from the total amount of C.

[Porosity]

The porosity was measured according to the open porosity test of the sintered metal material defined as JPMA M 02-1992.

[Radial Pressing Test]

Weight was placed on the sample having the ring-shape in the radial direction; and the test weight when the sample was broken was regarded as the radial crushing strength.

It is preferable that the radial crushing strength is 250 MPa or more.

[Dimensional Change]

The outer diameter of the green compact was measured before sintering in advance; and sintering was performed. Then, the dimension of the sintered material (the sintered sliding material) after sintering was measured; and the dimensional change before and after sintering was obtained by calculation.

It is preferable that the dimensional change is −2% or more and 0% or less.

[Yield]

The yield was obtained as the ratio in which the dimension after sizing was within the tolerance range. Grading was based on the measurement results of 50 samples. The tolerance range was set to 0.006 mm. When the product had the inner diameter within the tolerance range, it was regarded as an acceptable product. Grading of A, B, C, and D was performed based on the ratio of the acceptable products among the entire products. Grading criteria are shown below.

A: 95% or more were acceptable products

B: 90% or more and less than 95% were acceptable products

C: 80% or more and less than 90% were acceptable products

D: Less than 80% were acceptable products

[Abrasion Resistance]

First, the shaft, which was made of S45C and had the dimension of φ8 mm, was inserted in each sample having the ring-shape. Then, the load, which was the surface pressure of 15 MPa, was placed in the radial direction of the sample by placing the constant weight in the direction perpendicular to the axis direction of the shaft. Under the above-described state, the abrasion resistance test, in which the shaft was rotated at 30 m/minute for 100 hours, was performed. After completion of the test, the test piece was taken out; and the maximum wear depth on the sliding surface with the shaft was measured.

This abrasion rest was meant to simulate the sintered bearing was subjected to high speed rotation with high surface pressure.

It is preferable that the maximum wear depth is 10 μm or less.

TABLE 1

| | Bearing | Component composition of the material powder (mass %) | | | | | | Amount of C in the Cu—Ni powder % (Combined C) | Sintering temperature (° C.) |
|---|---|---|---|---|---|---|---|---|---|
| | | Cu—Ni alloy powder | Cu—P alloy powder | Sn powder | Graphite (C) powder | Ni powder | Total | | |
| Example of the Present invention | 1 | Cu-17% Ni: 88% | Cu-8% P: 3.0 | 7 | 2 | 0 | 100 | 0.052 | 860 |
| | 2 | Cu-20% Ni: 86% | Cu-8% P: 3.0 | 9 | 2 | 0 | 100 | 0.062 | 880 |
| | 3 | Cu-30% Ni: 86% | Cu-8% P: 3.0 | 9 | 2 | 0 | 100 | 0.048 | 910 |
| | 4 | Cu-35% Ni: 89% | Cu-8% P: 3.0 | 7 | 1 | 0 | 100 | 0.020 | 955 |
| | 5 | Cu-40% Ni: 88% | Cu-8% P: 3.0 | 8 | 1 | 0 | 100 | 0.041 | 970 |
| | 6 | Cu-25% Ni: 90% | Cu-8% P: 3.0 | 3 | 2 | 2 | 100 | 0.062 | 925 |
| | 7 | Cu-30% Ni: 89% | Cu-8% P: 3.0 | 6 | 2 | 0 | 100 | 0.052 | 925 |
| | 8 | Cu-30% Ni: 84% | Cu-8% P: 3.0 | 11 | 2 | 0 | 100 | 0.048 | 925 |
| | 9 | Cu-30% Ni: 82% | Cu-8% P: 3.0 | 13 | 2 | 0 | 100 | 0.052 | 925 |
| | 10 | Cu-30% Ni: 88.4% | Cu-8% P: 0.6 | 9 | 2 | 0 | 100 | 0.083 | 940 |
| | 11 | Cu-30% Ni: 87.75% | Cu-8% P: 1.25 | 9 | 2 | 0 | 100 | 0.052 | 925 |
| | 12 | Cu-30% Ni: 86.5% | Cu-8% P: 2.5 | 9 | 2 | 0 | 100 | 0.062 | 910 |
| | 13 | Cu-30% Ni: 84% | Cu-8% P: 5.0 | 9 | 2 | 0 | 100 | 0.041 | 890 |
| | 14 | Cu-30% Ni: 82.1% | Cu-8% P: 6.9 | 9 | 2 | 0 | 100 | 0.062 | 860 |
| | 15 | Cu-30% Ni: 90.4% | Cu-8% P: 0.6 | 9 | 0 | 0 | 100 | 0.020 | 940 |
| | 16 | Cu-30% Ni: 88.75% | Cu-8% P: 1.25 | 9 | 1 | 0 | 100 | 0.020 | 925 |
| | 17 | Cu-30% Ni: 85.5% | Cu-8% P: 3.0 | 10 | 1.5 | 0 | 100 | 0.074 | 925 |
| | 18 | Cu-30% Ni: 84% | Cu-8% P: 3.0 | 10 | 3 | 0 | 100 | 0.048 | 910 |
| | 19 | Cu-25% Ni: 82.2% | Cu-8% P: 5.0 | 9 | 3.8 | 0 | 100 | 0.020 | 890 |
| Comparative Example | 1 | Cu-10% Ni: 85.5% | Cu-8% P: 3.0 | 8 | 2 | 1.5 | 100 | 0.040 | 910 |
| | 2 | Cu-40% Ni: 86% | Cu-8% P: 3.0 | 5 | 2 | 5 | 100 | 0.057 | 915 |
| | 3 | Cu-20% Ni: 94% | Cu-8% P: 3.0 | 1 | 2 | 0 | 100 | 0.071 | 890 |
| | 4 | Cu-30% Ni: 79% | Cu-8% P: 3.0 | 15 | 2 | 1 | 100 | 0.037 | 890 |
| | 5 | Cu-25% Ni: 89% | Cu-8% P: 0 | 9 | 2 | 0 | 100 | 0.043 | 925 |
| | 6 | Cu-40% Ni: 80% | Cu-8% P: 10 | 9 | 1 | 0 | 100 | 0.055 | 925 |
| | 7 | Cu-30% Ni: 86% | Cu-8% P: 5.0 | 9 | 0 | 0 | 100 | 0.005 | 890 |
| | 8 | Cu-35% Ni: 81% | Cu-8% P: 5.0 | 9 | 5 | 0 | 100 | 0.150 | 890 |

TABLE 2

| Bearing | | Component composition (mass %) | | | | | | Porosity (%) | Redial pressing strength (MPa) | Dimensional change (%) | Yield | Maximum wear depth (μm) |
|---|---|---|---|---|---|---|---|---|---|---|---|---|
| | | Ni | Sn | P | C (total) | C (Free) | C (Combined) | Cu | | | | | |
| Example of the present invention | 1 | 15.0 | 6.8 | 0.24 | 2.054 | 1.997 | 0.057 | balance | 8.5 | 276 | −0.9 | A | 9.8 |
| | 2 | 17.2 | 9.0 | 0.24 | 2.051 | 1.991 | 0.060 | balance | 11 | 303 | −0.7 | A | 7.6 |
| | 3 | 25.8 | 9.2 | 0.24 | 2.056 | 2.003 | 0.053 | balance | 21.4 | 351 | −1.1 | A | 2.1 |
| | 4 | 31.2 | 7.4 | 0.24 | 1.01 | 0.988 | 0.022 | balance | 23.6 | 434 | −1.6 | B | 1.9 |
| | 5 | 35.2 | 8.1 | 0.24 | 1.042 | 0.995 | 0.047 | balance | 24.8 | 458 | −1.5 | B | 1.3 |
| | 6 | 24.5 | 3.0 | 0.24 | 2.047 | 1.989 | 0.058 | balance | 17.8 | 367 | −1.4 | A | 2.8 |
| | 7 | 26.7 | 6.3 | 0.24 | 2.05 | 1.994 | 0.056 | balance | 19.5 | 380 | −1.5 | B | 2.0 |
| | 8 | 25.2 | 11.2 | 0.24 | 2.033 | 1.99 | 0.043 | balance | 22.4 | 396 | −1.2 | A | 1.1 |
| | 9 | 24.6 | 13.0 | 0.24 | 2.063 | 2.001 | 0.062 | balance | 23.9 | 409 | −0.8 | A | 2.5 |
| | 10 | 26.5 | 8.7 | 0.05 | 2.077 | 1.996 | 0.081 | balance | 24.1 | 308 | −0.3 | A | 7.4 |
| | 11 | 26.3 | 9.2 | 0.1 | 2.054 | 1.996 | 0.058 | balance | 22.2 | 311 | −0.3 | A | 6.2 |
| | 12 | 26.0 | 8.3 | 0.2 | 2.068 | 1.998 | 0.070 | balance | 21.5 | 349 | −0.5 | A | 3.4 |
| | 13 | 25.2 | 9.2 | 0.4 | 2.038 | 2.000 | 0.038 | balance | 23.4 | 399 | −1.0 | A | 1.7 |
| | 14 | 24.6 | 9.1 | 0.55 | 2.061 | 1.995 | 0.066 | balance | 16.6 | 429 | −1.2 | B | 3.9 |
| | 15 | 27.1 | 8.9 | 0.05 | 0.02 | 0 | 0.020 | balance | 10.2 | 510 | −1.6 | B | 6.4 |
| | 16 | 26.6 | 8.8 | 0.1 | 1.022 | 0.997 | 0.025 | balance | 15.4 | 462 | −1.1 | A | 3.8 |
| | 17 | 25.7 | 10.3 | 0.25 | 1.58 | 1.503 | 0.077 | balance | 23.3 | 376 | −1.2 | A | 2.2 |
| | 18 | 25.2 | 9.5 | 0.25 | 2.947 | 2.902 | 0.045 | balance | 23.7 | 288 | −0.1 | A | 9.2 |
| | 19 | 20.6 | 8.8 | 0.37 | 3.807 | 3.787 | 0.020 | balance | 20.3 | 283 | −0.1 | A | 7.8 |
| Comparative Example | 1 | 10.1 | 7.5 | 0.25 | 2.038 | 2.002 | 0.036 | balance | 7.5 | 119 | −3.9 | D | 89 |
| | 2 | 39 | 4.8 | 0.25 | 2.055 | 1.997 | 0.058 | balance | 28.1 | 227 | −0.4 | A | 18 |
| | 3 | 18.8 | 1.0 | 0.25 | 2.075 | 1.998 | 0.077 | balance | 18.7 | 203 | −2.3 | C | 48 |
| | 4 | 23.7 | 15 | 0.25 | 2.039 | 1.998 | 0.041 | balance | 19.7 | 293 | −1.3 | C | 7.4 |
| | 5 | 22.3 | 8.8 | 0 | 2.04 | 1.996 | 0.044 | balance | 20.2 | 232 | −0.6 | B | 33 |
| | 6 | 32 | 9.2 | 0.8 | 1.063 | 1.002 | 0.061 | balance | 19.1 | 326 | −2.7 | D | 4.5 |
| | 7 | 25.8 | 9.0 | 0.4 | 0.009 | 0 | 0.009 | balance | 21.5 | 395 | −3.1 | D | 6.6 |
| | 8 | 28.4 | 8.9 | 0.4 | 5.141 | 4.988 | 0.153 | balance | 22.2 | 198 | 0.5 | A | 35 |

[Discussion]

Based on the results shown in Table 2, it was demonstrated that the radial pressing strength, the dimensional change, the yield, and the maximum wear depth were in the preferable ranges in the samples of Examples 1-19 of the present invention.

Contrary to that, the radial pressing strength was low; and the maximum wear depth was high in the sample of Comparative Example 1. The Ni content was less than 15 mass % in Comparative Example 1. Ni is a component increasing the strength of the Cu-based sintered part. It was interpreted that the strength in Comparative Example 1 was insufficient because of the insufficient Ni addition. Furthermore, it was confirmed that the dimensional stability was low in the sample of Comparative Example 1 based on the dimensional change and the yield.

The radial pressing strength was low; and the maximum wear depth was high in the sample of Comparative Example 2. The Ni content exceeded 36 mass % in the sample of Comparative Example 2. When the Ni content exceeded 36 mass %, sinterability was reduced drastically; and reduction of the strength and the abrasion resistance became unavoidable. It was interpreted that the strength in Comparative Example 2 was insufficient because of this excessive addition of Ni.

The radial pressing strength was low; and the maximum wear depth was high in the sample of Comparative Example 3. The Sn content was less than 3 mass % in Comparative Example 3. Sn is a component that forms solid solution with Ni and the like to improve the strength of the Cu-based sintered part. It was interpreted that solid solution was not formed sufficiently for the strength to be insufficient in Comparative Example 3 because of this insufficient addition of Sn. Furthermore, it was confirmed that the dimensional stability was low in the sample of Comparative Example 3 based on the dimensional change and the yield.

The dimensional stability was low in the sample of Comparative Example 4, based on the dimensional change and the yield. The Sn content exceeded 13 mass % in the sample of Comparative Example 4. When the Sn content exceeded 13 mass %, the dimensional change during sintering was increased for the dimensional accuracy to be reduced. It was interpreted that the dimensional accuracy was reduced in Comparative Example 4 was reduced because of this excessive addition of Sn.

The radial pressing strength was low; and the maximum wear depth was high in the sample of Comparative Example 5. P was not included in the sample of Comparative Example 5. P is a component that forms solid solution with Ni and the like to improve the strength of the Cu-based sintered part. It was interpreted that the strength in Comparative Example 5 was insufficient because of lack of P.

The dimensional stability was low in the sample of Comparative Example 6, based on the dimensional change and the yield. The P content exceeded 0.55 mass % in the sample of Comparative Example 6. When the P content exceeded 0.55 mass %, the dimensional change during sintering was increased for the dimensional accuracy to be reduced. It was interpreted that the dimensional accuracy was reduced in Comparative Example 6 was reduced because of this excessive addition of P.

The dimension was reduced excessively; and the yield was deteriorated in the sample of Comparative Example 7. The amount of the C (Combined) alloyed and included in the insides of the grains was less than 0.02 mass % in the sample of Comparative Example 7. When the amount of C (Combined) is less than 0.02 mass %, sintering is stimulated excessively because there is no inhibitor of sintering between each of material powders; and the dimension shrinks excessively by sintering. It is interpreted that the yield was deteriorated in the sample of Comparative Example 7 because of the insufficient amount of C (Combined).

The dimensional change had a positive value in the sample of Comparative Example 8. In other words, it was demonstrated that the sintered part expanded by sintering. The content of C (Combined) alloyed and included in the insides of the grains exceeded 0.1 mass % in the sample of Comparative Example 8. Based on this result, it was confirmed that the dimension expanded by sintering when the amount of C (Combined) exceeded 0.1 mass %. Moreover, the redial pressing strength was low; and the maximum wear depth was high in the sample of Comparative Example 8. It was interpreted that the bonding strength between each of grains was reduced because the content of C (Free) interposing in the grain boundaries as free graphite was high.

Embodiments and Examples of the present invention are explained above. Each of components, combinations, and the like in these Embodiments and Examples is only an example. Thus, the configuration of the present invention can be modified such as addition, omission, substitution, and the like, within the range not deviating from the scope of the present invention. In addition, the present invention is not limited by the descriptions of Embodiments and Examples.

INDUSTRIAL APPLICABILITY

A Cu-based sintered bearing, which has: high strength and abrasion resistance; and high dimensional accuracy, can be provided.

REFERENCE SIGNS LIST

1: Bearing (Cu-based sintered bearing)
2: Shaft
10: Cu-bases sintered part
11: Particle (Grain of Cu—Ni-based main phase)
12: Pore
12a: Internally-formed pore
12b: Externally-opened pore
13: Free graphite
14: Alloy layer with high Sn concentration
15: Exposed part

What is claimed is:
1. A Cu-based sintered bearing comprising:
15 mass % or more and 36 mass % or less of Ni;
3 mass % or more and 13 mass % or less of Sn;
0.05 mass % or more and 0.55 mass % or less of P;
0.02 mass % or more and 4 mass % or less of C in total; and
a balance containing Cu and inevitable impurities, wherein
a content of C alloyed with a matrix in grains of a Cu—Ni-based main phase is 0.038 mass % or more and 0.10 mass % or less.
2. The Cu-based sintered bearing according to claim 1, wherein a Ni content is 17.2 mass % or more and 35.2 mass % or less.
3. The Cu-based sintered bearing according to claim 1, wherein a Ni content is 20.6 mass % or more and 35.2 mass % or less.
4. The Cu-based sintered bearing according to claim 1, wherein a Sn content is 3.0 mass % or more and 11.2 mass % or less.
5. The Cu-based sintered bearing according to claim 1, wherein a Sn content is 3.0 mass % or more and 10.3 mass % or less.
6. The Cu-based sintered bearing according to claim 1, wherein a P content is 0.1 mass % or more and 0.55 mass % or less.
7. The Cu-based sintered bearing according to claim 1, wherein a P content is 0.2 mass % or more and 0.4 mass % or less.
8. The Cu-based sintered bearing according to claim 1, wherein a C content in total is 0.02 mass % or more and 3 mass % or less.
9. The Cu-based sintered bearing according to claim 1, wherein a C content in total is 1 mass % or more and 3 mass % or less.
10. The Cu-based sintered bearing according to claim 1, wherein the content of C alloyed with the matrix is 0.02 mass % or more and 0.081 mass % or less.
11. The Cu-based sintered bearing according to claim 1, wherein the content of C alloyed with the matrix is 0.038 mass % or more and 0.081 mass % or less.
12. The Cu-based sintered bearing according to claim 1, wherein a content of C as free graphite existing in grain boundaries between the grains of the Cu—Ni-based main phase is 4 mass % or less.
13. The Cu-based sintered bearing according to claim 1, wherein a content of C as free graphite existing in grain boundaries between the grains of the Cu—Ni-based main phase is 0.988 mass % or more and 4 mass % or less.
14. The Cu-based sintered bearing according to claim 1, wherein a content of C as free graphite existing in grain boundaries between the grains of the Cu—Ni-based main phase is 0.988 mass % or more and 3.787 mass % or less.
15. The Cu-based sintered bearing according to claim 1, wherein a porosity of the Cu-based sintered bearing is 8% or more and 25% or less.
16. The Cu-based sintered bearing according to claim 1, wherein a porosity of the Cu-based sintered bearing is 10% or more and 25% or less.
17. The Cu-based sintered bearing according to claim 1, wherein the C in total is 0.038 mass % or more and less than 3 mass %.
18. A method of producing the Cu-based sintered bearing according to claim 1, the method comprising the steps of:
mixing one or more raw material powders containing: 15 mass % or more and 36 mass % or less of Ni; 3 mass % or more and 13 mass % or less of Sn; 0.05 mass % or more and 0.55 mass % or less of P; and 0.02 mass % or more and 0.10 mass % or less of C; and the Cu balance containing inevitable impurities to obtain a mixed powder;
press-molding the mixed powder to obtain a green compact; and
sintering the green compact after the step of press-molding.
19. The method of producing the Cu-based sintered bearing according to claim 18, wherein a total amount of C of a C content included in the raw material powder and a C content originated from the free graphite is 0.02 mass % or more and 4 mass % or less.
20. The method of producing the Cu-based sintered bearing according to claim 18, wherein the raw material powders are a Cu—Ni alloy powder, a Sn powder, and a Cu—P alloy powder.
21. The method of producing the Cu-based sintered bearing according to claim 19, wherein the raw material powders are a Cu—Ni alloy powder, a Sn powder, and a Cu—P alloy powder.

* * * * *